United States Patent
Yamaguchi (10) Patent No.: US 6,675,381 B1
(45) Date of Patent: Jan. 6, 2004

(54) SOFTWARE-MODULE DYNAMIC LOADER, A SOFTWARE-MODULE DYNAMIC LOADING METHOD AND A MEDIUM STORING THE SOFTWARE-MODULE DYNAMIC LOADING METHOD

(75) Inventor: Tomohisa Yamaguchi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 402 days.

(21) Appl. No.: 09/635,795

(22) Filed: Aug. 11, 2000

(30) Foreign Application Priority Data

Jan. 20, 2000 (JP) .................................... 2000-011473

(51) Int. Cl.[7] ............................................... G06F 9/44
(52) U.S. Cl. ...................................... 717/168; 717/166
(58) Field of Search ............................... 717/162–178, 717/116; 707/203; 709/202, 203, 331–332; 713/2

(56) References Cited

U.S. PATENT DOCUMENTS

| | | | | |
|---|---|---|---|---|
| 5,974,428 A | * | 10/1999 | Gerard et al. ............... | 707/203 |
| 6,175,855 B1 | * | 1/2001 | Reich et al. ................ | 709/202 |
| 6,272,674 B1 | * | 8/2001 | Holiday, Jr. ................ | 717/174 |
| 6,279,030 B1 | * | 8/2001 | Britton et al. .............. | 709/203 |
| 6,470,494 B1 | * | 10/2002 | Chan et al. ................. | 717/166 |
| 6,496,871 B1 | * | 12/2002 | Jagannathan et al. ....... | 709/317 |
| 6,507,946 B2 | * | 1/2003 | Alexander et al. .......... | 717/145 |

FOREIGN PATENT DOCUMENTS

| | | |
|---|---|---|
| JP | A9292980 | 11/1997 |
| JP | A1145174 | 2/1999 |

OTHER PUBLICATIONS

Franz. Dynamic Linking of Software Components. IEEE. 1997. pp. 74–81.*
Gong. Secure Java Class Loading. IEEE. 1998. pp. 56–61.*

* cited by examiner

*Primary Examiner*—Wei Zhen
(74) *Attorney, Agent, or Firm*—Birch, Stewart, Kolasch & Birch, LLP (57) ABSTRACT

As a program configuration, a step of requesting a basic side to change an application class as an application module and a core class for changing the application class to a new version by themselves is provided in them. In a platform side for loading each of programs, a sub-core class loader for loading a new version based on a request for changing is provided. In a program of the base class in which the sub-core class loader is provided, a step of starting an operation of the application after loading the new version is provided.

7 Claims, 8 Drawing Sheets

PROCESSING IN BASE CLASS

| S41. REC. REQ. FOR RESTART. FM C. CL. (INST.) |
|---|
|    a)   CLEAR WAIT FLAG OF B. CL. (INST.) |
|    b)   RELEASE WAIT P. OF B. CL. (INST.) |
| S42. WAIT P. IN B. CL. |
|    a)   REPEAT TILL WAIT FLAG IS CLEARED. |
|    b)   WAIT AT (b) IN S41 TILL WAIT RELEASE. |
| S43. MAIN ROUTINE OF B. CL. |
|    REPEAT<br>   a)   GENE. S. C. CL. L. (INST.)<br>   b)   LOAD C. CL. BY S. C. CL. L. (INST.)<br>   c)   GENE. C. CL. (INST.)<br>       GIVE. B. CL. AS PARA.<br>   d)   START C. CL. (INST.)<br>   e)   SET WAIT FLAG ON.<br>   f)   JUMP TO WAIT P. (S42) |
| S44. REC. REQ. FOR RESTART. FM JavaVM |
|    a)   GENE. B. CL. (INST.) |
|    b)   EXE. M. ROUTINE OF B. CL |

PROCESSING IN SUB CORE CLASS LOADER

| S45. LODE D. OF CLASS (APPLI. CL., C. CL., ETC.) |
|---|
|    a)   OPEN FILE OF CLASS. |
|    b)   EXTRACT CLASS D. FM C. FILE. |
|    c)   RETURN CLASS D. |
| S46. LOAD CLASS. |
|    a)   RETURN C., IF LOADED.<br>   b)   IF CLASS IS SYS. CLASS (PROV. BY JavaVM),<br>       LOAD FM SYS. CL. L. (B. CL. IN FIG. 1) AND<br>       RETURN.<br>   c)   LOAD CLASS D.<br>   d)   MAKE CLASS FM CLASS D. (BY JavaVM)<br>   e)   RETURN CLASS. |

| METHOD | SP | REQ. URI | SP | HTTP VERSION | CRLF |

| HEADER | CRLF |

| CRLF |

| ENTITY BODY |

Fig. 8

| HTTP VERSION | SP | STATUS CODE | SP | REASON PHASE | CRLF |

| HEADER | CRLF |

| CRLF |

| MESSAGE BODY |

Fig. 9

CORE CLASS

Fig. 10 RELATED ART

SOFTWARE-MODULE DYNAMIC LOADER, A SOFTWARE-MODULE DYNAMIC LOADING METHOD AND A MEDIUM STORING THE SOFTWARE-MODULE DYNAMIC LOADING METHOD

BACKGROUND OF THE INVENTION

1. Field of the Invention

This invention relates to a software-module loading method for loading a module necessary for executing an application, which operates in a device connected to a network, from a remote terminal connected to the network.

2. Description of the Related Art

Figure 10:
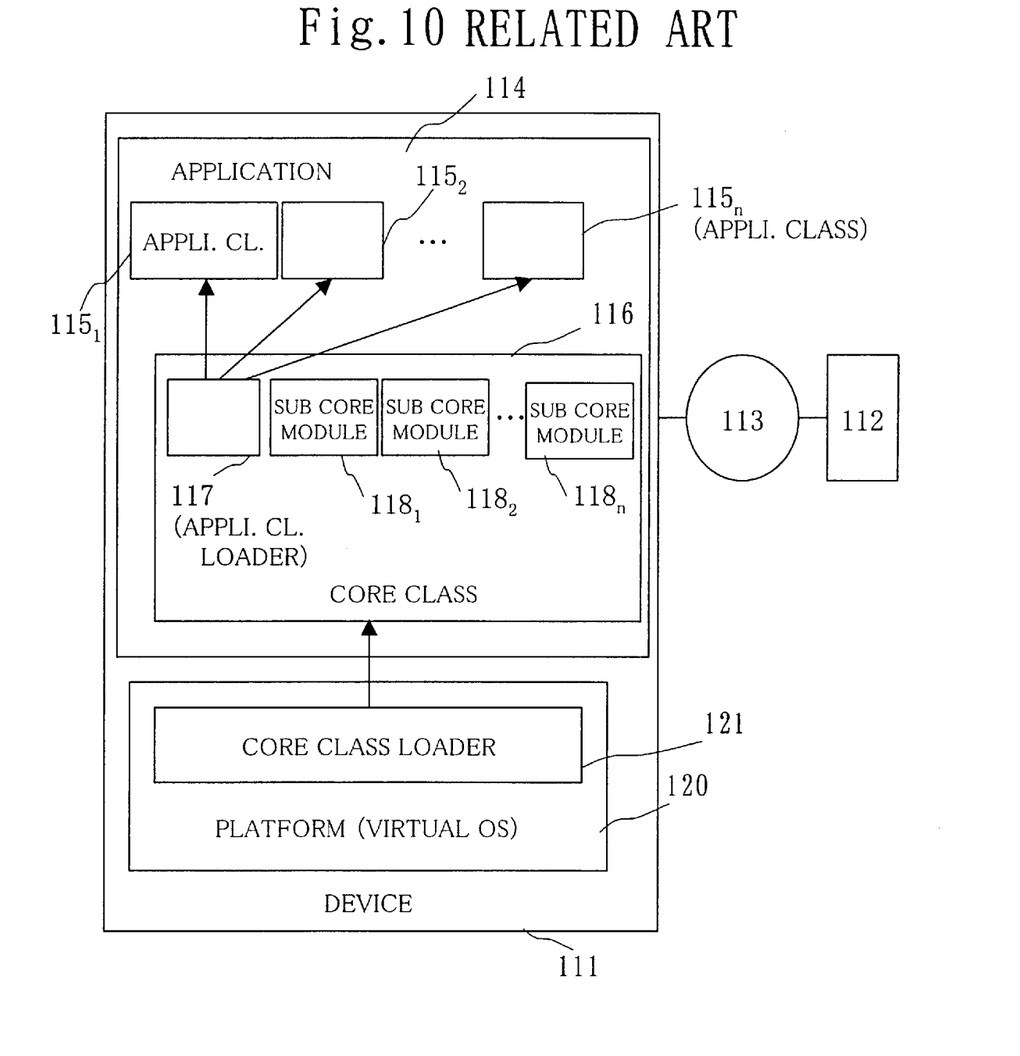
FIG. 10 illustrates a configuration of an apparatus for loading a module according to the related art.

In FIG. 10, a device and a terminal are connected to a network. FIG. 10 illustrates a typical system configuration according to the related art for loading a software-module in a device from a terminal, which is disclosed in Japanese Unexamined Published Patent Application HEI 11-45174.

In FIG. 10, a device 111, a terminal 112, a network 113 to which the device 111 and the terminal 112 are connected, an application 114 which operates in the device 111, a platform 120 (OS, i.e., operating system) for executing the application 114, application classes 115 (files A, B, and C) for realizing a function of the application 114, a core class 116 (copy filter) for managing and changing the application classes 115, an application class loader 117 for loading the application classes 115, sub-core-modules 118 for realizing a function of the core class, and a core class loader 121 for loading the core class 116 and each of the sub-core-modules 118 used in the core class 116 are illustrated.

In case that the application classes 115 are changed to new modules for upgrading the application 114 which operates in the device 111, the application class 115 is changed by being loaded through the application class loader 117 with a module loading function in the core class 116.

Explanations are made specifically with reference to FIG. 10.

The platform 120 loads the core class 116, the application class loader 117 and each of the sub-core-modules 118 by using the core class loader 121, and starts the core class 116 for starting the application 114.

When the core class 116 is started, the core class 116 loads the application class 115 by using the application class loader 117, and starts the application class 115 for realizing a function of the application 114.

In case that the application class 115 is to be changed, the core class 116 stops each of the application classes 115, loads a new application class 115 by using the application class loader 117 again, and starts an operation of the new application class 115. As started, in this related art, the application class loader (rename unit) is started without using the OS, and the application class is changed. However, in other related arts, since a load-module is (changed) started from the OS, the OS must be stopped once to change the application class.

In the above-stated case, the application class 115 can be changed by the core class 116 using the application class loader 117. However, in case that a function of the core class 116 is to be upgraded, it is necessary that the platform 120 is restarted and a new module (core class) is loaded by the core class loader 121 again. Otherwise, since the core class 116 and the application class loader 117 and sub-core-module 118 which are used in the core class 116 are loaded by the core class loader 121 in the platform 120 (virtual OS), loading of the module must be supported by the platform 120 while it is active.

Normally, since loading of the module is not supported by the platform 120, it is necessary to stop a system once and restart the platform for changing the core class 116 and the application class loader 117. As stated, if a changing range is set not to stop the system, only the application class 115 can be upgraded in the application 114. Even starting processing for changing the application class 115 is restricted within a function range of the core class 116.

SUMMARY OF THE INVENTION

As stated, according to the related arts, a function-module (application class) can be loaded during operation, however a main-core-module (core class) and a function-module loader (sub-core-module) can not be loaded during operation.

It is one of intentions of this invention to solve the above-stated problems. According to this invention, it becomes possible to change the function-module and the core class from a basic side, e.g., the OS, etc. without stopping an application program during operation of the device.

According to one aspect of this invention, a software-module dynamic loader for storing an application class and an application class loader upon a platform comprises a sub-core class loader for loading a new version of the one of the application class and the application class loader based on the load demanding step in which the platform is working, and the one of the application class and the application class loader demands loading the new version to the sub-core class loader.

According to another aspect of this invention, a software-module dynamic loading method for storing an application class and an application class loader upon a platform comprises load demanding of loading one of the application class and the application class loader in the application class to a sub-core class loader, loading a new version of the one of the application class and the application class loader based on the load demanding, in which the platform is working, and starting the application class after loading the new version.

Further features and applications of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Other objects features, and advantages of the invention will be apparent from the following description when taken in conjunction with the accompany drawings.

DETAILED DESCRIPTION OF THE PREFERRED EMBODIMENTS

Embodiment 1.

A module, e.g., main-core-module, etc. or a core class in an application side is changed not only by processing from a virtual OS. By inserting and including a pseudo mechanism (program and step) for a basic program, e.g., OS, etc., it becomes possible to load the module or core dynamically without stopping the OS.

There are applications such as a document composition program and a spread sheet allowing to stop OS for updating. However, there are some applications included in an online equipment and a control equipment which had better not be stopped.

Figure 1:
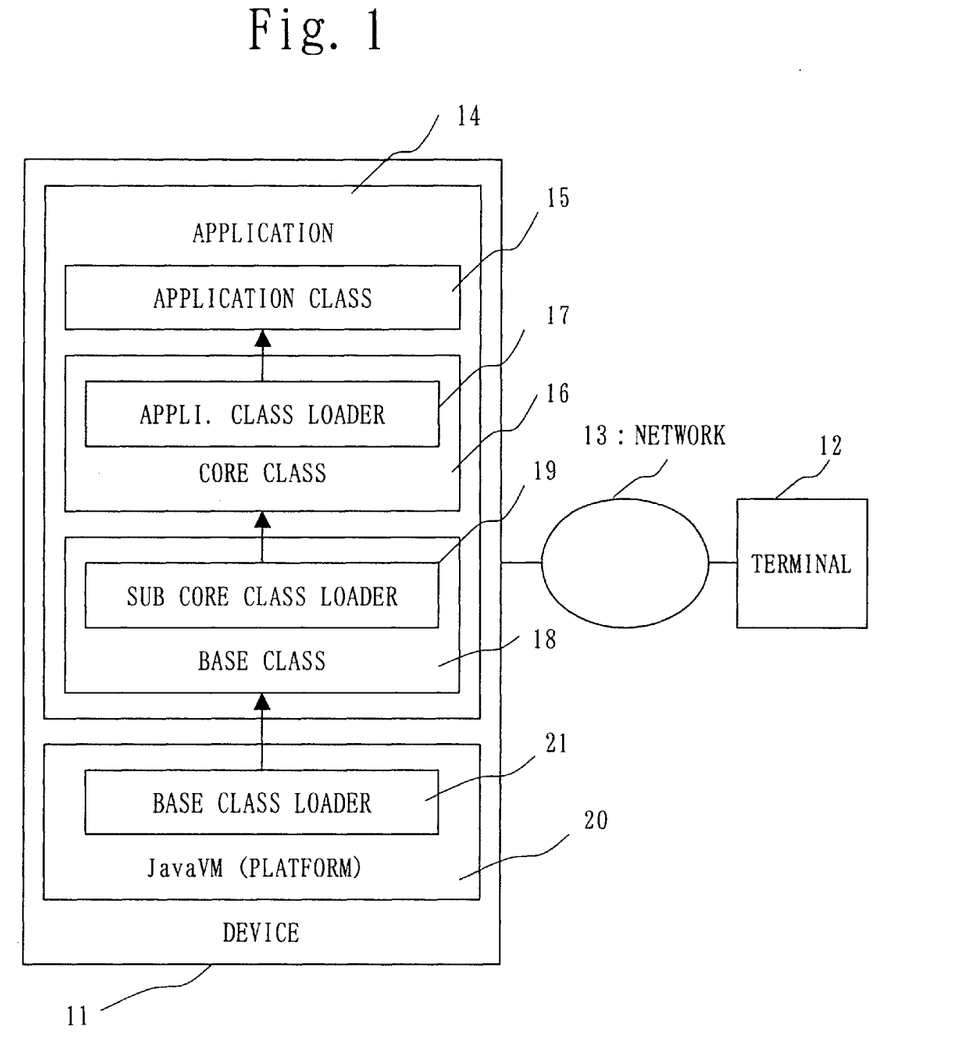
FIG. 1 illustrates a program configuration in embodiment 1 of this invention.

FIG. 1 explains a program hierarchy in embodiment 1 of this invention.

FIG. 1 illustrates new elements, i.e., a base class 18 for loading and starting the core class and a class equipped in the core class and a sub-core class loader equipped in the base class 18 for loading a core class 16, an application class loader 17, etc. while the OS is operating. FIG. 1 also illustrates elements, e.g., a device 11, a terminal 12, a network to which the device 11 and the terminal 12 are connected, an application 14 operating in the device 11, an application class 15 for realizing a function of the application 14, the core class 16 for managing and changing the application class 15 and a class (not illustrated) used in the application class 15 and requesting the application class 15 to start processing, the application class loader 17 for loading the application class 15 and the class used in the application class 15, JavaVM 20 as a platform, and a base class loader 21 for loading various classes (only the base class 18 and a sub-core class loader 19 are illustrated). In this system, Java is assumed as the platform. However, other kinds of platforms which operate like the Java may be used.

An actual case for changing the application class is stated below.

Change of the application depends on a type of the device. For example:

1-1) In case that a monitor camera has functions of moving in vertical and horizontal directions and zooming, however an application for controlling the monitor camera before change supports only the function of zooming, the function of moving in the vertical and horizontal directions are added by changing the application. (In this case, the application is not sufficient for the function of the device.)

In case that an image taken by the monitor camera is compressed at a low compressing rate by using an application for controlling the monitor camera and distributed, if the application is changed to an application for compressing at a high compressing rate, the image taken by the monitor camera can be distributed with a higher quality without changing a bit rate. Or, the image with a same quality can be distributed at a lower bit rate. (The function of the device doesn't influence.)

1-2) A function for controlling a temperature in an application for controlling a refrigerator is changed to one for achieving more efficiently.

1-3) In an application for controlling a vending machine, data have been able to be obtained by accessing the vending machine from a terminal. However, by changing the application to one with a function of reporting from the vending machine to the terminal, it becomes possible to report that goods will be running short and that small money for change is running short, for example. A sale on the day can be also reported.

Examples for changing the core class are stated below.

2-1) So far, for loading the application class, a file of the class has been downloaded to the device once before change. However, if the class is loaded directly through a network by upgrading and changing the core class, a resource for storing the file of the class in the device can be saved.

2-2) A core class, in which a controlling method of the application class is changed, is upgraded.

Figure 2:
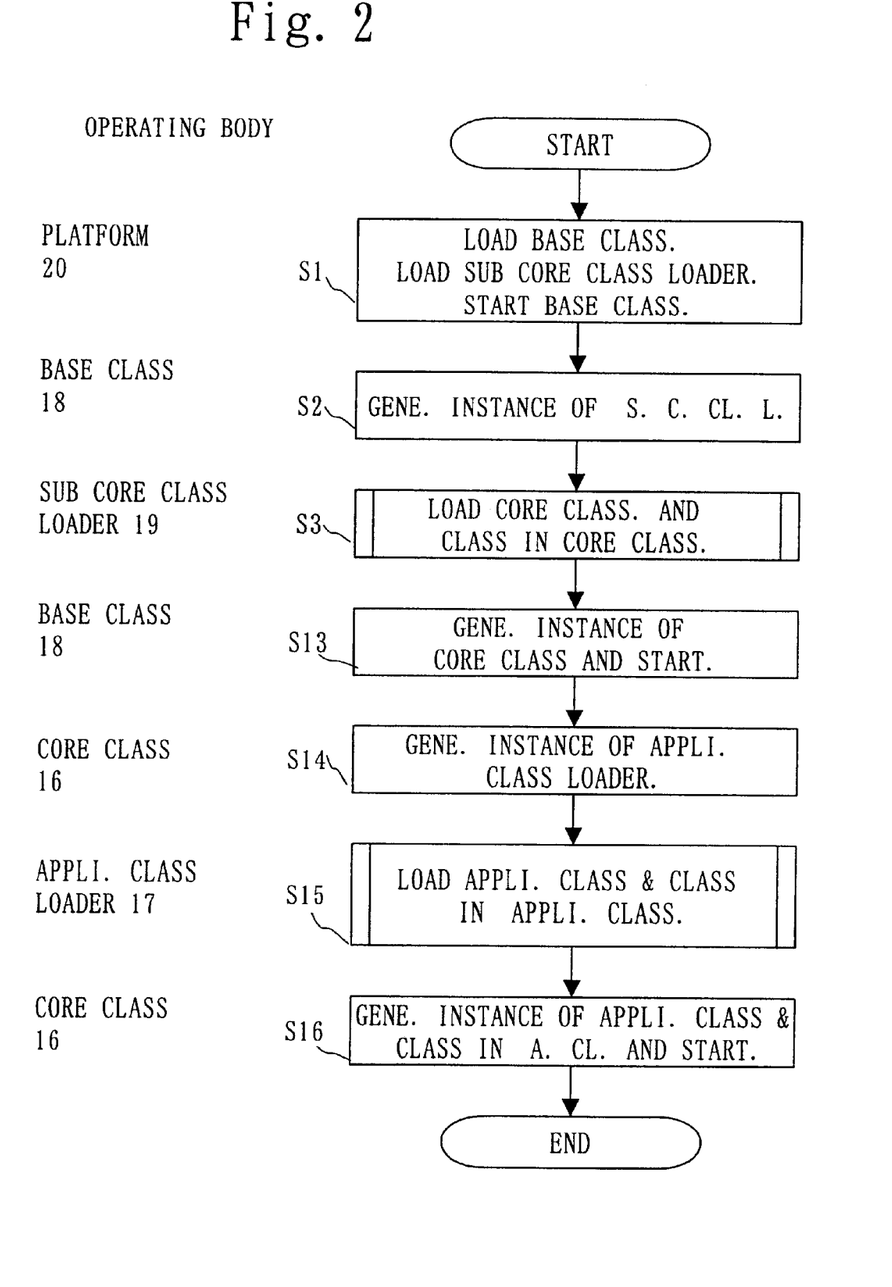
FIG. 2 shows a flow chart of operations till starting an application in embodiment 1.

With reference to FIG. 2, processing till starting the application 14 is explained.

For starting the application 14, the JavaVM 20 as the platform loads the base class 18 by using a base class loader 21. The sub-core class loader 19 used in the base class 18 is also loaded. Further, a method for starting the base class 18 is called, and the application 14 is started (Step S1, "Step" is omitted, hereinafter). Since this processing is performed in the JavaVM 20, the processing depends on the platform. Generally, the above-stated processing is performed.

Figure 3:
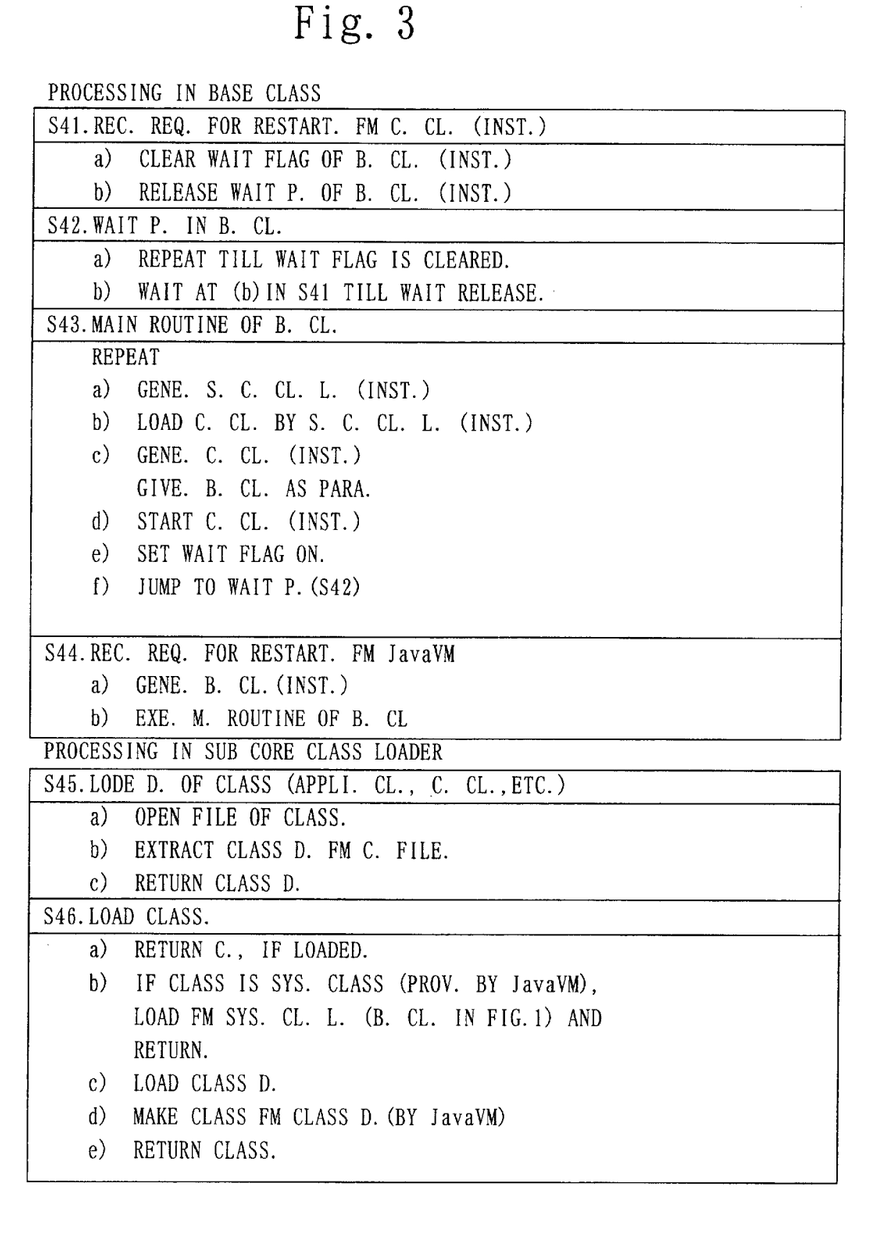
FIG. 3 illustrates an example of a content of a base class in embodiment 1.

Since the class loaded by the base class loader 21 is not loaded again unless the JavaVM 20 is started again, it is impossible to change the class loaded by the base class loader 21 dynamically. However, the base class 18 has only a simple function as illustrated in FIG. 3 so that the base class 18 doesn't need to be changed. FIG. 3 illustrates an actual configuration of the base class 18 with the simple function and the sub-core class loader provided between the JavaVM 20 and the core class 16 in FIG. 1. Particularly, processing in S41, S43, S45, and S46 are important in FIG. 3. In this example, the core class 16 and the class used in the core class 16 are loaded, and start of processing is requested to the core class 16. Also, a function of receiving a request for updating an application from the application 14 in the base class is provided instead of the OS of the device. This is explained later in an update operation.

The base class 18 started by the JavaVM 20 generates an instance of the sub-core class loader 19 (S2), and loads the core class 16 and the class used in the core class 16 by using the instance (S3). In this example, only the application class loader 17 is explained in the core class 16. By adding the above-stated new elements, steps of S2 and S3 have to be added. These steps are effective for a later update operation.

Figure 4:
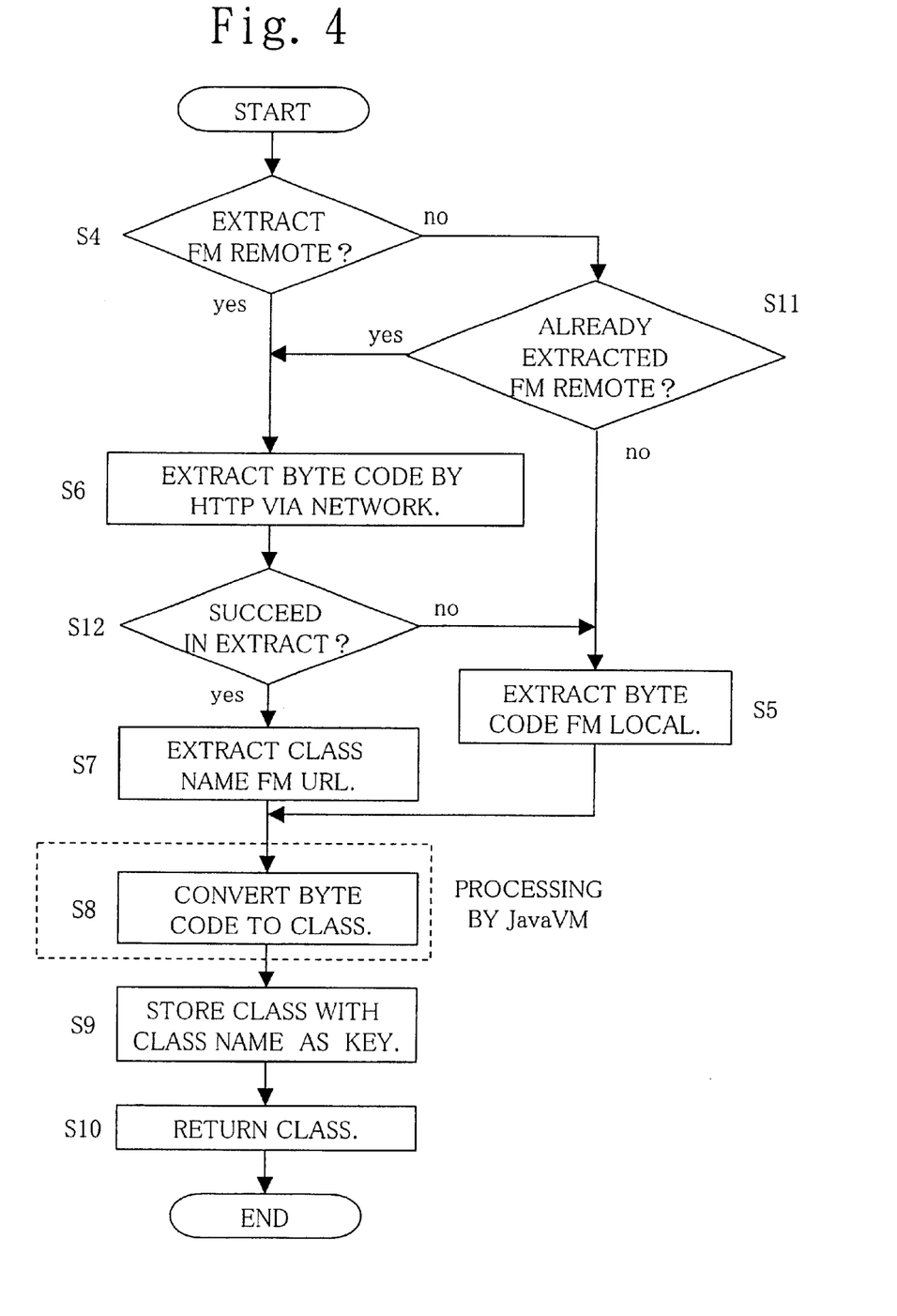
FIG. 4 shows a detailed flow chart of operations of S3 in FIG. 2.

With reference to FIG. 4, step of S3 in processing of loading the core class 16 and the class used in the core class is explained in details. Loading of the base class depends on the platform. In this explanation on loading of the base class, the Java is used as the platform.

In case that the sub-core class loader 19 extracts a byte code of the core class 16, it is determined if the byte code is extracted from the local or the remote (S4). For judging if the byte code should be extracted from the local or the remote, a class name can be selected from the application. Therefore, for example, when the byte code should be extracted from a Web server in the remote, processing is possible by specifying a name of a loading class as "http://host name/class name." An actually loaded byte code has a file name of "class name.class." Therefore, the byte code can be extracted by requesting the Web server providing the necessary byte code in a URL (Uniform Resource Locator) of "http://host name/class name" and ".class" at an end. In this case, the Web server providing the byte code must be set so that the byte code can be obtained in the above URL.

In case that upgraded data are already stored in a local buffer as a file, the sub-core class loader 19 extracts the byte code from the file in the local (S5). In case that the byte code is extracted from the remote on line, the sub-core class loader 19 extracts the byte code from the Web server by using the above stated HTTP (Hypertext Transfer Protocol) through the network (S6). For extracting from the remote, the class name is extracted from the URL (S7).

Then, the extracted byte code is converted to a class by using a method provided in the JavaVM 20 (S8), and the class name is stored as a key (S9). The class is returned to a requestor (S10). This is the end of S3.

The stored class is used to be returned without extracting the byte code again in case that there is a request for the same class. This processing is same as a normal method used in the Java except that "http://host name/" is added before the class name in case of extracting the byte code from the remote.

Further, in case that the method of making the byte code prepared in JavaVM 20 become a class is used, loading of a class used in the class is requested, and loading of the class is performed as in the above-stated method. However, since loading is requested from the JavaVM 20, "http://host named/" is not added before the class name for specifying. Therefore, it is impossible to judge if the extracting byte code is in the local or the remote. It is examined if there has been any byte code extracted from the remote (S11). If there is such a byte code, the byte code is tried to be extracted from the location in the remote. Then, it is examined if the byte code is extracted successfully (S12). If failed, the byte code is extracted from the local.

This processing is repeated until any other class is called. Loading of the class is performed as above stated. This processing is same as in loading the class stated later.

In FIG. 2, the base class 18 generates an instance of the core class 16, and calls a method for starting processing defined in the core class 16 for the generated instance (S13). The base class 18 keeps waiting that a response to the call for a method for starting processing to the core class 16 is returned.

Since the core class 16 and the class used in the core class 16 are loaded by the sub-core class loader 19, the class loaded by the sub-core class loader 19 can be changed by regenerating an instance of the sub-core class loader 19 and reloading in the base class 18. A method for reloading the class is same as the method stated for loading of the class.

Then, the core class 16 started by the base class 18 generates an instance of the application class loader 17 (S14), and loads the application class 15 and the class used in the application class 15 by using the instance (S15). Processing in loading is same as processing by the sub-core class loader 19.

Then, the core class 16 generates an instance of the application class 15, and calls a method for starting processing defined in the application class 15 for the generated instance (S16). For calling the method, the core class 16 itself is set as a parameter so that a request for changing the core class 16 and the class used in the core class 16 can be received from the application class 15. Then, the core class 16 keeps waiting that a response to a call for a method for starting processing is returned from the application class 15.

Since the application class 15 and the class used in the application class 15 are loaded by the application class loader 17, the class loaded by the application class loader 17 can be changed by regenerating an instance of the application class loader 17 and reloading in the core class 16. A method for reloading the class is same as the method stated for loading of the class.

The application class 15 started by the core class 16 performs processing for a function provided by the application 14. Since the processing is not related to this invention, explanations are omitted.

Processing till rising the application 14 has been stated.

Figure 5:
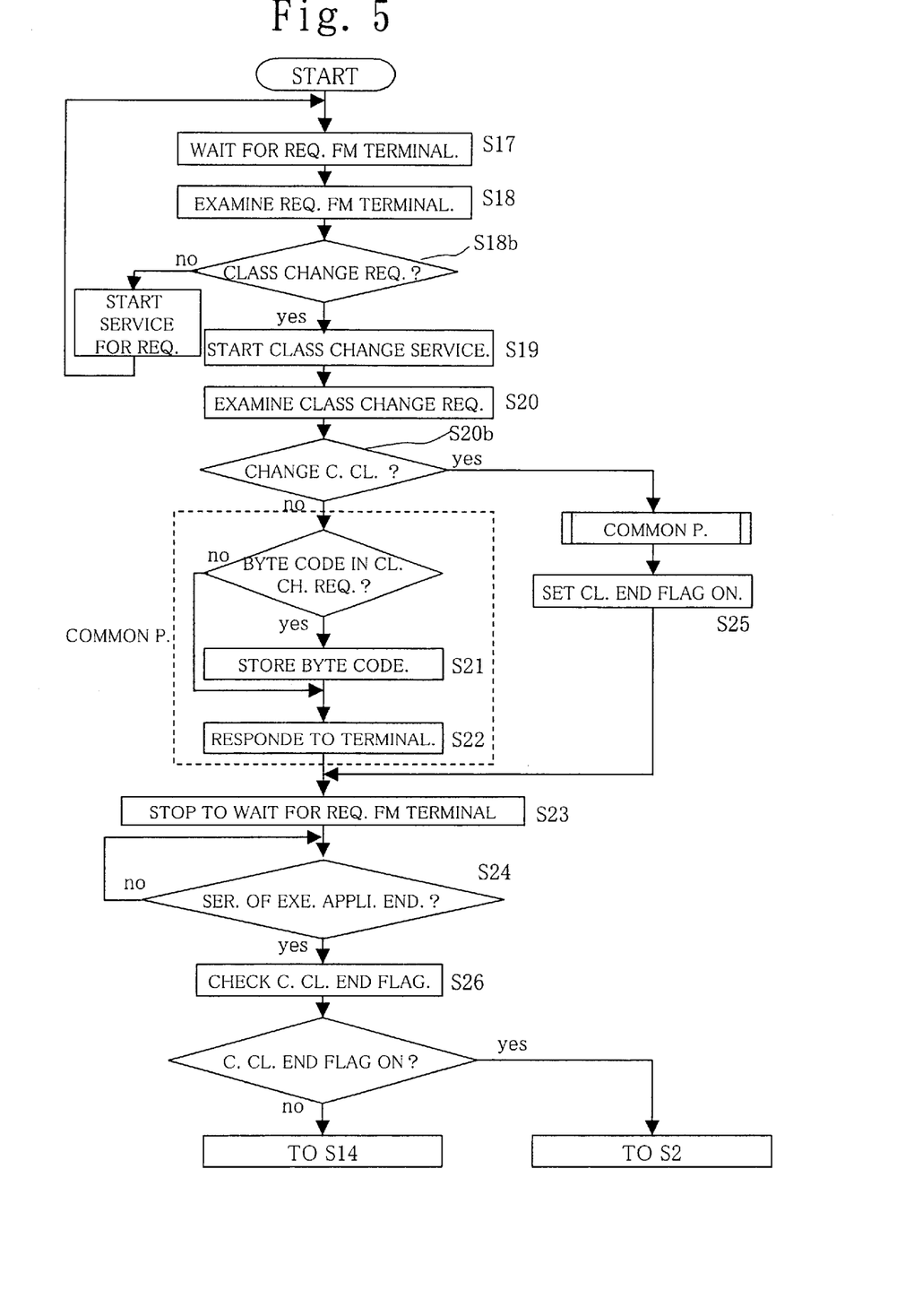
FIG. 5 shows a flow chart of operations based on a module load request in embodiment 1.

With reference to FIG. 5, explanations are made on processing in changing a class without stopping an important operation of the OS.

When there is a request for loading a module during monitoring by the application 14, S14 in FIG. 2 is interrupted in case of changing the application class and S2 in FIG. 2 is interrupted in case of changing the core class. Then, succeeding operations for changing are performed.

As stated, it is possible to change the application class 15 and the class used in the application class 15 loaded by the application class loader 17 and the core class 16 and the class used in the core class 16 loaded by the sub-core class loader 19. Even for changing a level of the core class 16, a parameter is set and received from the application class 15 by the core class 16, and transmitted to the base class 18 instead of the platform. Accordingly, the base class 18 is started. The base class 18 and the sub-core class loader 19, which are newly inserted, can perform an operation of changing instead of the OS.

Figure 6:
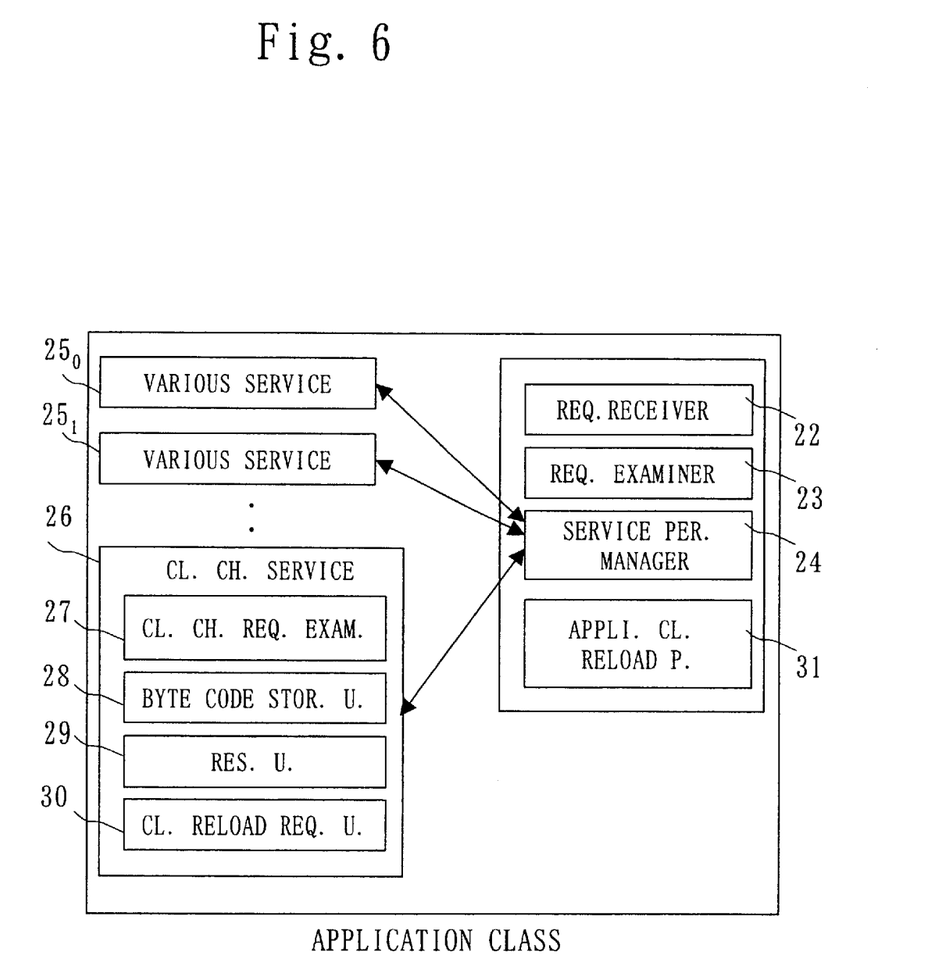
FIG. 6 shows a detailed configuration of an example of an application class.

FIG. 6 illustrates a detailed configuration of the application class.

In FIG. 6, a request receiver 22 for receiving a request from the terminal 12, a request examiner 23 for examining a content of the request received from the terminal 12 by the request receiver 22, a service performance manager 24 for performing a service subject to the request obtained in examination by the request examiner 23 and managing a number of actually performing services, various service 25 for performing services subject to the request from the terminal 12, a class changing service 26 for changing the class, and a class change request examiner 27 for examining a class requested to be changed in the request for changing a class are illustrated. A byte code storing unit 28 for writing a new byte code of a class over an old byte code in the local in case that the new byte code of the class is included in the parameter of the request for changing the class, a response unit 29 for returning a response to the terminal 12, a class reload request unit 30 for sending a request for reloading the class to the application class 15 or the core class 16, and an application class reload processor 31 for processing for reloading the application class 15 and the class used in the application class 15.

Explanations are made on a case in which the application class 15 and the class used in the application class 15 are changed.

Figure 7:
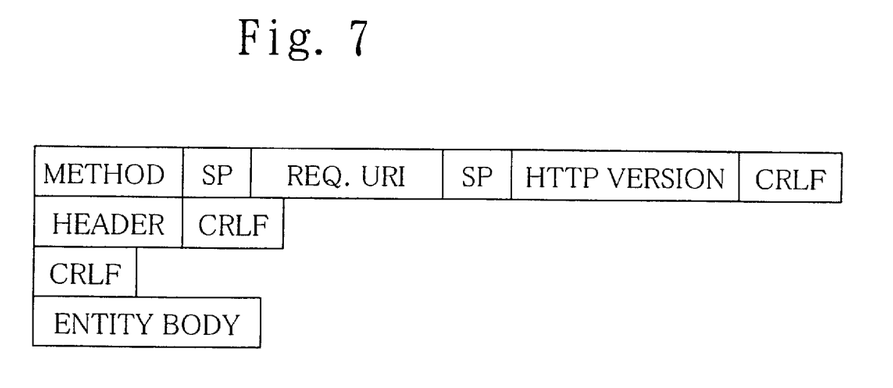
FIG. 7 illustrates an example of a format of a change request from a terminal in embodiment 1.

The application class 15 waits for a request from the terminal 12 by using the request receiver 22 (S17). When the request is sent from the terminal 12, the request examiner 23 examines the request (S18). If the terminal 12 is a Web browser and the application 14 is a Web server, the request from the terminal 12 is as illustrated in FIG. 7. It is possible to select which service is requested by examining a method and a request URI in FIG. 7. For example, if the method is "GET" and the request URI is "/default.html", the service is returning a content of a file of "default.html" in a route on the Web server. It is also possible to select a request for changing the class by setting the method as "POST" and the request URI as "/servlet/ExchangeClass." It is also possible to set the request in other ways.

Then, the service performance manager 24 performs the service according to the request obtained in the above-stated examination by the request examiner 23. The service can be CGI (Computer Generation Image) program, a servlet, or anything as far as performable.

In this case, the request for changing a class is assumed, the class changing service 26 is started (S19).

Then, the class changing service 26 examines if the request for changing the class is a request for changing the application class 15 and the class used in the application class 15 or a request for changing the core class 16 and the class used in the core class 16 by using the class change request examiner 27 (S20). As an examining method, if the request from the terminal is a HTTP request as stated above, the request URI is set as "/servlet/ExchangeApplicationClass" for changing the application class 15, and the request URI is set as "/servlet/ExchangeCoreClass" for changing the core class 16. In this case, it is presumed that the examination has revealed that the application class 15 and the class used in the application class 15 are changed.

If the class in the local is to be changed, a new byte code of the class to be changed is attached to the request for changing the class as a parameter. If the request from the terminal 12 is a HTTP request, a byte code is set in an entity body.

Then, the class changing service 26 writes the new byte code over the old byte code in the local by using the byte code storing unit 28 (S21).

In case that the class to be changed is in the remote, a user who wants to change the class writes a new byte code over the old byte code in the remote, and sends a request for changing the class without a parameter.

Figure 8:
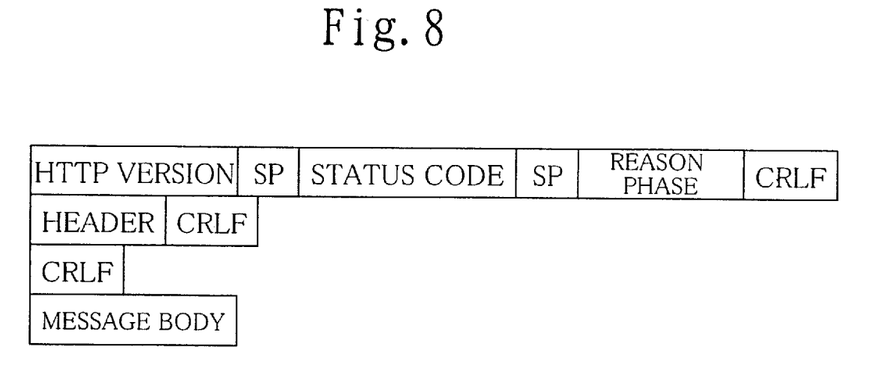
FIG. 8 illustrates an example of a format of a response to the change request for the terminal in embodiment 1.

Then, the class changing service 26 returns a response from the response unit 29 to the terminal 12 (S22). As stated, when HTTP is used in communication with the terminal 12, the response as illustrated in FIG. 8 is returned. For example, if the processing till this step is succeeded and a class is going to be changed, "200" as a status code, "Content-Type:text/plain" as a header, "Start changing a class" as a message body, etc. are set, and the response is sent to the terminal 12.

Then, the class changing service 26 sends a request for reloading the class to the application class 15 by using a class reload request unit 30, and ends its processing. The request for reloading the class can be just calling a method. Other methods can be also used. In this case, the request is calling the method.

The application class 15 receives the request for reloading the class by using an application class reload processor 31. If the request for reloading the class is calling the method as above stated, the application class reload processor functions as the method.

The application class 15 requests the request receiver 22 to stop receiving the request from the terminal (S23), This request can be just calling a method. Other methods are also possible.

The request receiver 22 stops receiving the request from the terminal 12 based on the request to stop. It is able to stop by going out of a loop waiting for the request. Other methods are also possible.

If the various service 25 is operating in the application class 15 by using the service performance manager 24, the application class 15 waits the service ending (S24). As stated above, in case that the application 14 is the Web server, the various service 25 ends after returning a response to the terminal 12.

Then, when all the various service 25 operating in the application is ended, the application class 15 ends its processing.

Since the core class 16 keeps waiting that a response to calling of the method is returned after the core class 16 calls the method for staring processing of the application class 15, when the application class 15 ends processing, a control is back to the core class 16.

Then, the core class 16 examines a flag of ending the core class, which is stated later (S26). If the flag is off, an instance of the application class loader 17 is regenerated. The application class 15 and the class used in the application class 15 are loaded by using the newly generated instance of the application class loader 17.

Processing in case that the flag of ending the core class is on is explained in changing of the core class 16 and the class used in the core class 16.

As in the processing of starting the application 14, the core class 16 generates an instance of the application class 15, and calls a method for starting processing defined in the application class 15 based on the generated instance. Then, a response to the call for the method for starting processing is kept being waited. As stated, the application class 15 and the class used in the application class 15 are changed.

Explanations are on another important operation in which the core class 16 and the class used in the core class 16 are changed.

Unless specifically stated, each processing is same as the processing in changing the application class 15 and the class used in the application class 15.

The application class 15 waits for the request from the terminal 12 by using the request receiver 22 (S17). When the request is sent from the terminal 12, the request examiner 23 examines the request (S18).

Since the request is to change the class, the service performance manager 24 starts the class changing service 26 (S19).

Then, the class changing service 26 examines if the request is to change the application class 15 level or the core class 16 and the class used in the core class 16 by using the class change request examiner 27 (S20). In this case, it is presumed that the result of examination reveals that the core class 16 and the class used in the core class 16 are changed.

Then, if the class to be changed is located in the local, a new byte code of the class to be changed is attached to the class change request as a parameter, and the class changing service 26 writes the new byte code over the old byte code in the local (S21). If the class to be changed is located in the remote, the user writes a new byte code over the old byte code in the remote, and sends a request for changing the class without the parameter. The class changing service 26 returns a response from the response unit 29 to the terminal 12 (S22), and ends its processing as in changing the application class 15 level.

Figure 9:
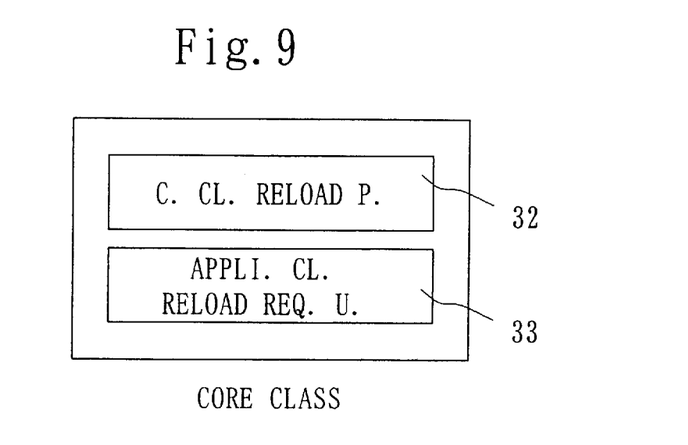
FIG. 9 illustrates an example of a configuration of the core class.

FIG. 9 illustrated a configuration of the core class 16.

In FIG. 9, a core class reload processor 32 for receiving a request for reloading a class and processing for reloading the core class 16 and the class used in the core class 16 and an application class reload request unit 33 for requesting reloading of a class in the application class 15 are illustrated.

In the core class 16, the core class reload processor 32 receives the request for reloading the class. If the request for reloading the class is calling a method as above stated, the core class reload processor functions as the method.

When the application class 15 ends, the core class 16 sets a flag of ending the core class on for ending itself (S25).

Then, the core class 16 sends a request for reloading a class to the application class 15 by using the application class reload request unit 33. As stated above, the request for reloading the class can be just calling a method. Other methods are also possible. In this case, the request is calling the method.

In the application class 15, the application class reload processor 31 receives the request for reloading the class, and requests the request receiver 22 to stop accepting the request from the terminal 12 (S23). If the various service 25 is operating in the application class 15, the application class 15 waits for the service ending (S24). When all the operating various service 25 ends, the application class 15 ends its processing.

The core class 16 calls the method for starting processing of the application class 15, and keeps waiting that a response to calling the method is returned. Therefore, if the processing of the application class 15 ends, a control is back to the core class 16.

The core class 16 checks if the flag of ending the core class is on (S26). In this case, the flag of ending the core class has been turned on by the core class reload processor 32 as above stated. Therefore, the core class 16 ends its processing.

The base class 18 calls the method for starting processing of the core class 16, and keeps waiting that a response to calling the method is returned. Therefore, when the processing of the core class 16 ends, the control is back to the base class 18. The processing goes back to S2 in FIG. 2 after checking in S26.

In the base class 18 performing another important operation regenerates an instance of the sub-core class loader 19. In S3, the core class 16 and the class used in the core class 16 is loaded by using the newly generated instance of the sub-core class loader 19. Then, an instance of the core class 16 is generated as in processing for starting the application 14, and calls a method for starting processing defined in the core class 16 based on the generated instance. Then, a response to the call for the method for starting processing is kept being waited.

Further, a processing same as processing in starting the application 14 stated for the core class 16 is performed, and the application class 15 is started. Accordingly, the core class 16 and the class used in the core class 16 are changed.

The core class 16 and the class used in the core class 16 become able to be changed. Accordingly, all the classes configuring functions of the application 14 in the device become able to be changed.

As stated, according to this invention, since the sub-core class loader and the base class are provided for loading a new module based on a request for changing from the application, the core class and the application class can be changed without stopping the OS, i.e., the platform.

Having thus described several particular embodiments of the invention, various alterations, modifications, and improvements will readily occur to those skilled in the art. Such alterations, modifications, and improvements are intended to be part of this disclosure, and are intended to be within the spirit and scope of the invention. Accordingly, the foregoing description is by way of example only and is limited only as defined in the following claims and the equivalents thereto.

What is claimed is:

1. A software-module dynamic loader, to be stored in a computer-readable medium, for storing an application class and an application class loader upon a platform comprising:
    a sub-core class loader, generated from a base class for loading a new version of both the application class and the application class loader, both generated from a core class that is generated by said base class, based on a load demanding step, wherein the platform is working and,
    wherein the one of the application class and the application class loader demands loading the new version to the sub-core class loader.

2. The software-module dynamic loader according to claim 1 further comprising a memory for the new version of the one of the application class and the application class loader, wherein the memory stores before the loading.

3. The software-module dynamic loader according to claim 1 further comprising an interface to a network system through which the new version of the one of the application class and the application class loader is sent.

4. A software-module dynamic loading method for storing an application class and an application class loader upon a platform comprising:
    load demanding of loading one of the application class and the application class loader in the application class to a sub-core class loader;
    loading a new version of both the application class and the application class loader based on a load demanding, wherein the platform is working; and
    starting the application class after loading the new version; wherein the sub-core class loader is generated from a base class; wherein the application class and the application class loader are generated from a core class that is generated by said base class.

5. A medium storing software-module dynamic loading method for performing the steps of claim 4.

6. The software-module dynamic loading method according to claim 4, wherein the new version of the one of the application class and the application class loader is sent from a network.

7. A system for dynamic loading of a software-module, comprising:
    a terminal for requesting a new version of software to be loaded;
    a network for delivering said new version of software to be loaded;
    a device, storable in a computer-readable medium, including a platform, wherein said platform including a base class for generating a core class and a sub-core class loader; and
    wherein said sub-core class loader, during platform operation, to load said new version of software for both an application class and an application class loader, both generated from said core class, in response to a request from said terminal, by receiving said new version of software from said network.

* * * * *